(12) United States Patent
Kim et al.

(10) Patent No.: US 9,283,964 B2
(45) Date of Patent: Mar. 15, 2016

(54) DRIVING MODE RECOMMENDATION SYSTEM BASED ON CUSTOMER CHARACTERISTIC INFORMATION AND ENVIRONMENT ANALYSIS INFORMATION, AND METHOD THEREOF

(71) Applicant: Hyundai Motor Company, Seoul (KR)

(72) Inventors: Seon Su Kim, Seongnam-si (KR); Seung-Chang Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/313,280

(22) Filed: Jun. 24, 2014

(65) Prior Publication Data

US 2015/0166076 A1   Jun. 18, 2015

(30) Foreign Application Priority Data

Dec. 17, 2013   (KR) .................. 10-2013-0157583

(51) Int. Cl.
*B60W 30/182*   (2012.01)
*B60W 50/00*    (2006.01)

(52) U.S. Cl.
CPC ..... *B60W 30/182* (2013.01); *B60W 2050/0077* (2013.01); *B60W 2050/0079* (2013.01); *B60W 2050/0089* (2013.01); *B60W 2550/12* (2013.01); *B60W 2550/141* (2013.01);
(Continued)

(58) Field of Classification Search
CPC .......................... B60W 50/082; B60W 30/182
See application file for complete search history.

(56) References Cited

U.S. PATENT DOCUMENTS

| 9,008,858 B1* | 4/2015 | Payne ................ B60W 50/085 701/1 |
| 2010/0010697 A1* | 1/2010 | Soma ..................... B60K 6/445 701/22 |
| 2011/0153127 A1* | 6/2011 | Weslati ............... B60W 50/085 701/22 |

(Continued)

FOREIGN PATENT DOCUMENTS

| JP | 2010-250718 A | 11/2010 |
| JP | 2013-169915 A | 9/2013 |

(Continued)

OTHER PUBLICATIONS

Seonggyu Kang, et al.,: "Intelligent Driver Accommodation System", KASE 2011 Annual Conference, pp. 1760-1765, with English abstract.

*Primary Examiner* — Jonathan M Dager
(74) *Attorney, Agent, or Firm* — McDermott Will & Emery LLP (57) ABSTRACT

A driving mode recommendation method stores driving mode information in a database for each customer and recommends a driving mode based on customer characteristic and environment analysis information. The method includes receiving a starting point and a destination from a terminal of a corresponding customer vehicle by a server. A route from the starting point to the destination is divided into sections according to a road type and a road form. It is determined whether the driving mode information is stored in the database for the divided sections. The stored driving mode information is generated as recommendation mode information for a section where the driving mode information is stored in the database by the server. Average value information of a general customer is generated as the recommendation mode information for a section where the driving mode information is not stored in the database.

12 Claims, 8 Drawing Sheets

(52) U.S. Cl.
CPC ... *B60W 2550/142* (2013.01); *B60W 2550/143* (2013.01); *B60W 2550/402* (2013.01); *B60W 2550/404* (2013.01)

(56) References Cited

U.S. PATENT DOCUMENTS

| | | | | |
|---|---|---|---|---|
| 2011/0166731 A1* | 7/2011 | Kristinsson | B60W 10/08 | 701/22 |
| 2011/0184642 A1* | 7/2011 | Rotz | G01C 21/3492 | 701/533 |
| 2011/0208646 A1* | 8/2011 | McMaster | B06Q 30/02 | 705/39 |
| 2011/0231086 A1* | 9/2011 | Montealegre | G01C 21/3461 | 701/532 |
| 2011/0309926 A1* | 12/2011 | Eikelenberg | G01C 21/3469 | 340/439 |
| 2012/0010767 A1* | 1/2012 | Phillips | G01C 21/3469 | 701/22 |
| 2012/0010768 A1* | 1/2012 | Phillips | B60L 11/123 | 701/22 |
| 2012/0271497 A1* | 10/2012 | Kleine-Besten | B60W 10/06 | 701/22 |
| 2013/0218427 A1* | 8/2013 | Mukhopadhyay | B60W 40/09 | 701/51 |
| 2014/0046518 A1* | 2/2014 | Roos | B60W 10/26 | 701/22 |
| 2014/0074392 A1* | 3/2014 | Holm | G01C 21/3415 | 701/400 |
| 2014/0107876 A1* | 4/2014 | Kapp | B61L 3/006 | 701/20 |
| 2014/0365105 A1* | 12/2014 | Kono | G01C 21/32 | 701/123 |
| 2015/0051774 A1* | 2/2015 | Roesch et al. | | 701/22 |

FOREIGN PATENT DOCUMENTS

| | | |
|---|---|---|
| KR | 10-2011-0071613 A | 6/2011 |
| KR | 10-2013-0066161 A | 6/2013 |

\* cited by examiner

| Road division | | Average value of general customer in driving mode (indexed based on 1.0) | | |
|---|---|---|---|---|
| Road type | Road form | Active Eco | Steering wheel | ... |
| Expressway | Straight ascent | 1.1 | 1.2 | ... |
| | Straight descent | 1.2 | 0.9 | ... |
| | Descending curve | 0.8 | 0.9 | ... |
| | ... | ... | | ... |
| Unpaved road | Straight ascent | 1.1 | 1.2 | ... |
| | Straight descent | 0.9 | 0.9 | ... |
| | Descending curve | 1.2 | 1.3 | ... |
| | ... | ... | | ... |
| Town road | | ... | ... | ... |
| General outer road | | ... | ... | ... |
| ... | ... | ... | ... | ... |

FIG. 6

| Road division | | Average value of corresponding customer in driving mode | | |
|---|---|---|---|---|
| Road type | Road form | Active Eco | Steering wheel | ... |
| Expressway | Straight ascent | 1.0 | 1.3 | ... |
| | Straight descent | 1.1 | 1.0 | ... |
| | Descending curve | 0.9 | 0.9 | ... |
| | ... | ... | ... | ... |
| Unpaved road | Straight ascent | 1.1 | 1.2 | ... |
| | Straight descent | 1.0 | 1.0 | ... |
| | Descending curve | 1.2 | 1.3 | ... |
| | ... | ... | ... | ... |
| Town road | ... | ... | ... | ... |
| General outer road | ... | ... | ... | ... |
| ... | ... | ... | ... | ... |

FIG. 7

| | | Calculation weight | | | | |
|---|---|---|---|---|---|---|
| Driving mode | | Active Eco | Steering wheel | Sports mode | 4WD mode | ... |
| External environment | Temperature | | 5% | | 5% | |
| | Humidity | | 5% | | 5% | |
| | Fog or not | 13% | 5% | 13% | 5% | |
| | Rain or not | 13% | 5% | 13% | 5% | |
| | Snow or not | 13% | 5% | 13% | 5% | |
| | Accident or not | 10% | 2% | 2% | 2% | |
| | ... | | | | | |

FIG. 8

DRIVING MODE RECOMMENDATION SYSTEM BASED ON CUSTOMER CHARACTERISTIC INFORMATION AND ENVIRONMENT ANALYSIS INFORMATION, AND METHOD THEREOF

CROSS-REFERENCE TO RELATED APPLICATION

This application claims the benefit of priority to Korean Patent Application No. 10-2013-0157583 filed in the Korean Intellectual Property Office on Dec. 17, 2013, the entire contents of which are incorporated herein by reference.

TECHNICAL FIELD

The present disclosure relates to a driving mode recommendation system and a method thereof, and more particularly, to a driving mode recommendation system based on customer characteristic information and environment analysis information, and a method thereof.

BACKGROUND

In recent years, various electronic devices have been installed and various functions have been installed in a vehicle for convenience of passengers, and there has been a large difference in performance according to a vehicle model. In addition, in recent years, the vehicle has provided various driving modes including an active eco mode, a steering mode, a sport mode, a 4WD mode, and the like.

However, in the related art, driving mode functions may be improperly used, and a driver needs to set the driving mode functions while driving the vehicle. A number of drivers drive the vehicle in a specific mode while repetitive driving. In addition, there is a case that the specific mode changes depending on an environmental condition even with the same driver.

Accordingly, the driving mode used in the related art needs to reflect an environment element while driving according to the driver.

However, in the related art, the driving mode of a customer cannot correspond to a section characteristic, or the driving mode cannot reflect the environmental condition. In particular, customer characteristic information depending on a usual driving habit of the customer or an environment element such as weather, or the like cannot be reflected.

The above information disclosed in this Background section is only for enhancement of understanding of the background of the disclosure and therefore it may contain information that does not form the prior art that is already known in this country to a person of ordinary skill in the art.

SUMMARY

The present disclosure provides a driving mode recommendation system based on customer characteristic information and environment analysis information, and a method thereof that recommend a driving mode reflected with an environmental condition or a customer characteristic such as a usual driving habit or the like to drivers.

The present disclosure provides a driving mode recommendation system based on customer characteristic information and environment analysis information, and a method thereof which can achieve optimal driving by driving a vehicle from a starting point to a destination based on a recommendation received for a recommendation mode suitable therefor for each section.

Further, the present disclosure provides a driving mode recommendation system based on customer characteristic information and environment analysis information, and a method thereof in which a manufacturer can enhance recognition as the manufacturer to consider drivers.

According to an exemplary embodiment of the present disclosure, a driving mode recommendation method stores driving mode information in a database for each customer, which corresponds to a road type and a road form and recommends a driving mode based on customer characteristic information and environment analysis information. The method includes receiving, by a server, a starting point and a destination from a terminal of a corresponding customer vehicle. A route from the starting point to the destination received is divided into sections according to the road type and the road form by the server. It is determined whether the driving mode information is stored in the database for each of the divided sections by the server. The stored driving mode information is generated as recommendation mode information for a section where the driving mode information is stored in the database by the server. Average value information of a general customer is generated as the recommendation mode information for a section where the driving mode information is not stored in the database by the server.

The method may further include correcting the generated recommendation mode information of each section by reflecting external environment information by the server. The corrected recommendation mode information is transmitted to the terminal of the customer vehicle by the server.

The road type may include at least one of an expressway, an unpaved road, a town road, and a general outer road.

The road form may include at least one of a straight ascent, a straight descent, a descending curve, and an ascending curve.

The external environment information may include information regarding at least one of a temperature, humidity, fog, rain, snow, and an accident or not.

The recommendation mode information may include information regarding at least one of an active eco mode, a steering mode, a sport mode, and a 4 wheel drive (WD) mode.

According to another exemplary embodiment of the present disclosure, a driving mode recommendation system that communicates with at least one terminal of a customer vehicle is provided. The system includes a database configured to store driving mode information of a customer, average value driving mode information of a general customer, road type and road state information, and environment analysis information. A server receives a starting point and a destination from the terminal of the customer vehicle, dividing a route from the starting point to the destination received into sections according to a road type and a road form, generating the stored driving mode information as recommendation mode information for a section where the driving mode information is stored in the database for each divided section, and generating average value information of the general customer as the recommendation mode information for a section where the driving mode information is not stored in the database.

The server may correct the generated recommendation mode information of each section by reflecting external environment information and transmit the corrected recommendation mode information to the terminal of the customer vehicle.

The server may receive customer information, driving information, and driving mode information of the customer vehicle from the terminal of the customer vehicle and accumulate and store the received information in the database, when driving of the customer vehicle is ended.

The server may include a driving mode information receiver receiving customer information, driving information, and driving mode information of the customer vehicle from the terminal of the customer vehicle and accumulating and storing the received information in the database when driving of the customer vehicle is ended, and storing the driving mode information of the general customer in the database storing driving mode average value information of the general customer. An information receiver receives the starting point and the destination from the terminal of the customer vehicle. A recommendation mode information generator divides the route from the starting point to the destination received by the information receiver into the sections according to the road type and the road form, generates the stored driving mode information as the recommendation mode information for the section where the driving mode information is stored in the database for each divided section, and generates the average value information of the general customer as the recommendation mode information for the section where the driving mode information is not stored in the database. A recommendation mode information corrector corrects the generated recommendation mode information by reflecting the external environment information and transmits the corrected recommendation mode information to the terminal of the customer vehicle.

In exemplary embodiments of the present disclosure, a driving mode recommendation system based on vehicle customer characteristic information and environment analysis information and a method thereof are provided, which recommend a driving mode reflected with an environment condition or customer characteristics including a usual driving habit, and the like for drivers.

In addition, the driving mode recommendation system based on the vehicle customer characteristic information and the environment analysis information and the method thereof are provided, which recommend the driving mode reflected with the environment condition or the customer characteristics including the usual driving habit, and the like for the drivers and apply the driving mode to achieve stable and safe driving by providing a similar driving environment as usual.

The driving mode recommendation system based on the customer characteristic information and the environment analysis information and the method thereof are provided, which, although the driver goes on a first trip which the driver has not been to, the driver is recommended with the driving mode through an average value of general drivers to drive the vehicle, thereby achieving the safe driving.

The driving mode recommendation system based on the customer characteristic information and the environment analysis information and the method thereof are provided, which can achieve optimal driving because the driver drives the vehicle from a starting point to a destination by receiving a recommendation for a recommendation mode suitable therefor for each section.

Further, the driving mode recommendation system based on the customer characteristic information and the environment analysis information and the method thereof are provided in which a manufacturer can enhance recognition as to consider the drivers.

DETAILED DESCRIPTION OF THE EMBODIMENTS

Hereinafter, exemplary embodiments of the present disclosure will be described in detail with reference to the accompanying drawings.

As those skilled in the art would realize, the described embodiments may be modified in various different ways, all without departing from the spirit or scope of the present disclosure. In addition, each configuration illustrated in the drawings is arbitrarily shown for understanding and ease of description, but the present disclosure is not limited thereto.

Figure 1:
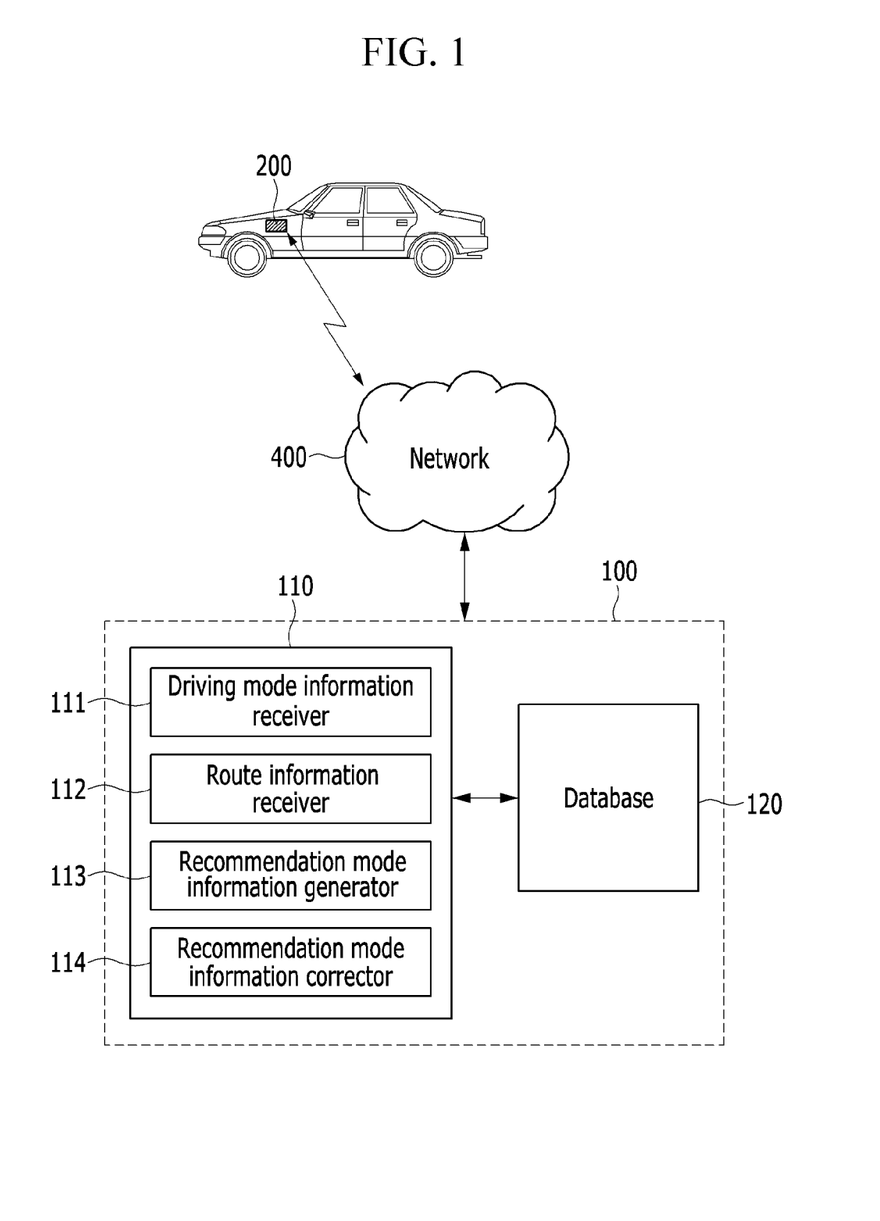
FIG. 1 is a configuration diagram of a driving mode recommendation system according to an exemplary embodiment of the present disclosure.

FIG. 1 is a configuration diagram of a driving mode recommendation system according to an exemplary embodiment of the present disclosure.

Referring to FIG. 1, a driving mode recommendation system according to an exemplary embodiment of the present disclosure, a driving mode recommendation system 100 communicates with at least one terminal 200 of a customer vehicle. The driving mode recommendation system 100 includes a database 120 storing driving mode information of a customer, average value driving mode information of a general customer, road type and road state information, and environment analysis information. A server 110 receives a starting point and a destination from the terminal 200 of the customer vehicle and divides a route from the starting point to the destination into sections according to a road type and a road form. The server 110 further generates the stored driving mode information as recommendation mode information for a section where the driving mode information is stored in the database and generates average value information of a general customer as the recommendation mode information for a section where the driving mode information is not stored in the database for each division section.

The server 110 corrects the generated recommendation mode information of each section by reflecting external environment information and transmits the corrected recommendation mode information to the terminal 200 of the customer vehicle. The server 110 receives customer information, driving information, and driving mode information of the customer vehicle from the terminal 200 of the customer vehicle, stores the received information in the database 120, and stores the driving information and the driving mode information in the database 120 when driving of the vehicle is ended. The server 110 includes a driving mode information receiver 111, a route information receiver 112, a recommendation mode information generator 113, and a recommendation mode information corrector 114.

The driving mode information receiver 111 receives the customer information, the driving information, and the driving mode information of the customer vehicle from the terminal 200 of the customer vehicle. When driving of the vehicle is ended, the driving mode information receiver 111 accumulates and stores the received information in the database 120. In this case, the driving mode information of the customer may be stored as an average value as necessary. In addition, the driving mode information receiver 111 stores driving mode information or average value information of a general customer in the database 120.

The route information receiver 112 receives the starting point and the destination from the terminal 200 of the customer vehicle.

The recommendation mode information generator 113 divides the route from the starting point to the destination received by the route information receiver 112 into the sections according to the road type and the road form. The recommendation mode information generator 113 generates the driving mode information stored with respect to the section storing the driving mode information in the database 120 as the recommendation mode information with respect to the respective divided sections and generates the average value information of the general customer as the recommendation mode information with respect to the section not storing the driving mode information in the database 120.

The recommendation mode information corrector 114 reflects external environment information to the generated recommendation mode information to correct the generated recommendation mode information and transmits the corrected recommendation mode information to the terminal 200 of the customer vehicle.

The road type includes at least one of an expressway, an unpaved road, a town road, and a general outer road. The road form includes at least one of a straight ascent, a straight descent, a descending curve, and an ascending curve. The external environment information includes information regarding at least one of a temperature, humidity, fog, rain, snow, and an accident or not. The recommendation mode information includes information regarding at least one of an active eco mode, a steering mode, a sport mode, and a 4 wheel drive (WD) mode.

Figure 2:
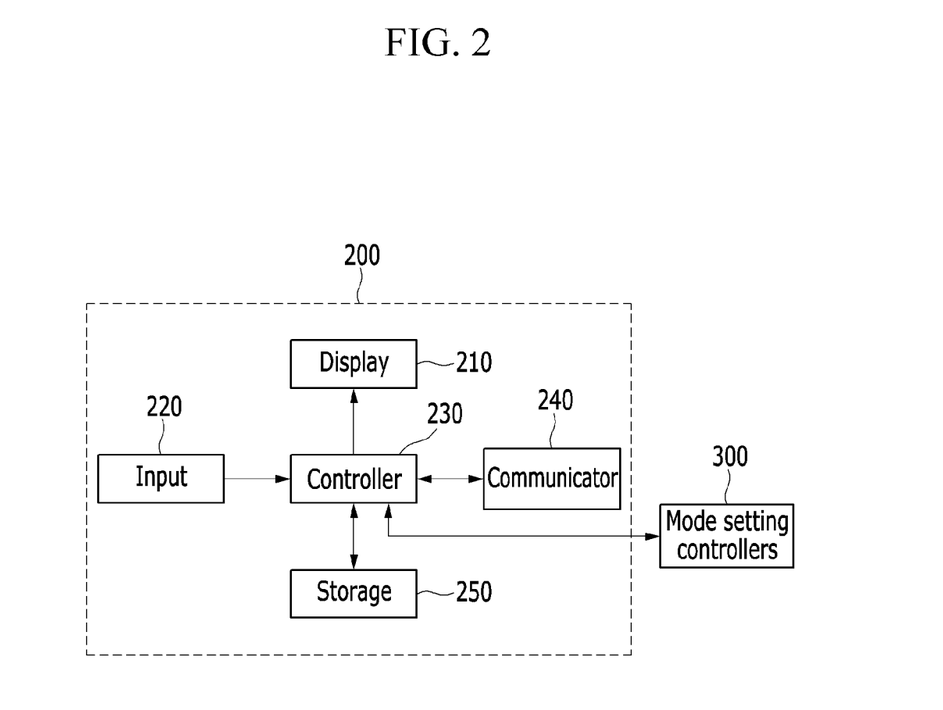
FIG. 2 is a diagram illustrating a terminal and a mode setting controller of a vehicle applied to a driving mode recommendation system according to an exemplary embodiment of the present disclosure.

FIG. 2 is a diagram illustrating a terminal and a mode setting controller of a vehicle applied to a driving mode recommendation system according to an exemplary embodiment of the present disclosure.

Referring to FIG. 2, the terminal 200 includes a display 210, an input 220, a controller 230, a communicator 240, and a storage 250. The display 210 displays a recommendation mode, or the like to allow a driver to view the recommendation mode, or the like. The input 220 is used for information input such as inputting the destination or selecting or changing the displayed recommendation mode. The controller 230 controls communication with the server 110 and transmits information on the starting point and the destination of the customer vehicle to the server 110. In addition, the controller 230 controls the received recommendation mode information to be displayed in the display 210. Further, the controller 230 transmits the driving mode information, traveling information, and the like to the server 110 when traveling of the vehicle is completed or after the vehicle travels in a predetermined section. The communicator 240 performs a communication function with the server 110 and performs wireless communication. In detail, the communicator 240 transmits and receives data in at least one of various radio modes including a CDMA mode, a Wi-Fi mode, 3G, 4G, and the like. In addition, the mode setting controller 300 may internally communicate with the controller 230.

When a customer views the recommendation mode information displayed in the display 210 and selects application of the recommendation mode information, the mode setting controller 300 changes a current driving mode to the recommendation mode to drive the vehicle. In addition, when the vehicle travels in the recommendation mode or changes the current mode to the recommendation mode, the current driving mode to the recommendation mode while the vehicle travels, the traveling information and the driving mode are stored in the storage 250. As necessary, the display 210, the input 220, and the storage 250 are not included in the terminal 200 and may be present separately from the terminal 200.

An operation of a driving mode recommendation system according to an exemplary embodiment of the present disclosure, which has the above configuration, will be described below.

Figure 3:
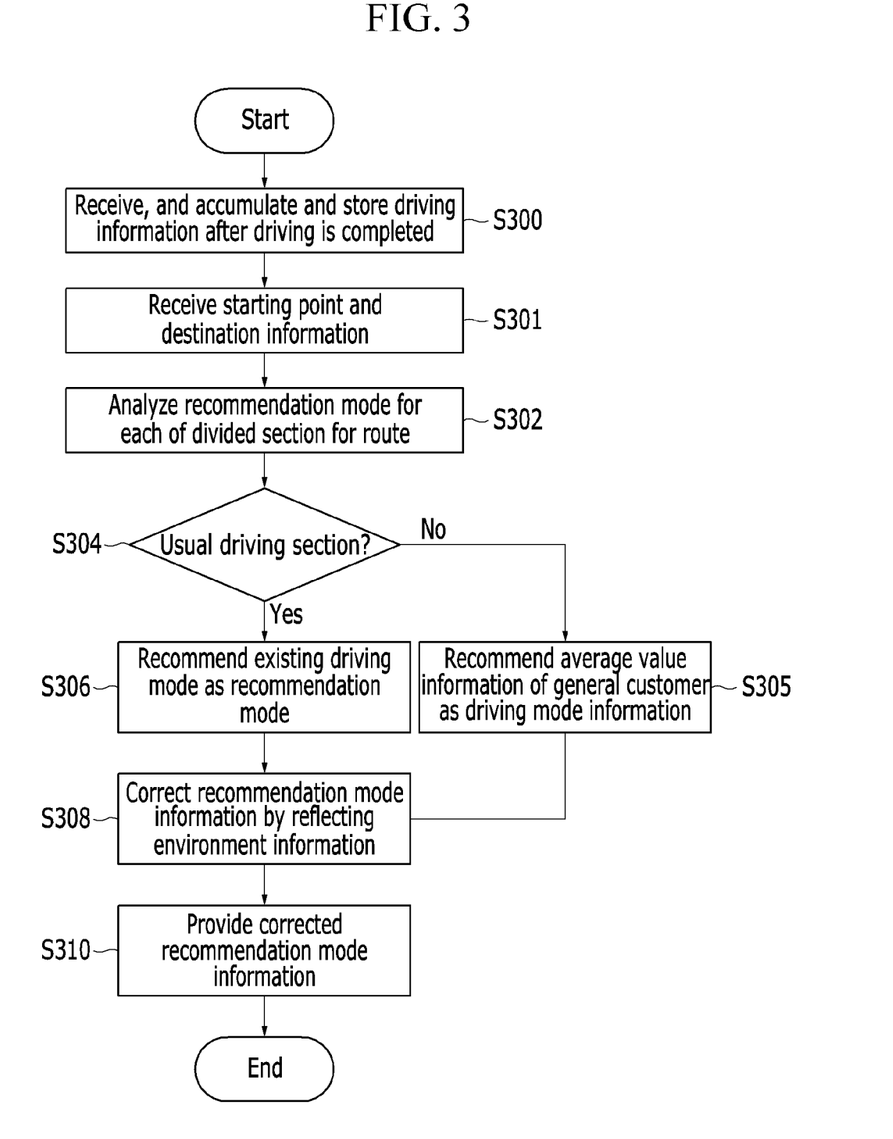
FIG. 3 is an operational flowchart of a driving mode recommendation method according to an exemplary embodiment of the present disclosure.
Figure 4:
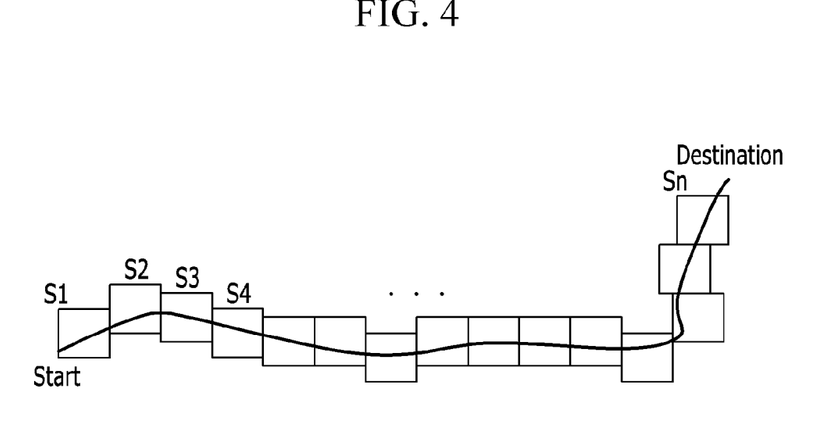
FIG. 4 is a diagram illustrating an example in which a route from a starting point to a destination is divided into sections in a driving mode recommendation system according to an exemplary embodiment of the present disclosure.
Figure 5:
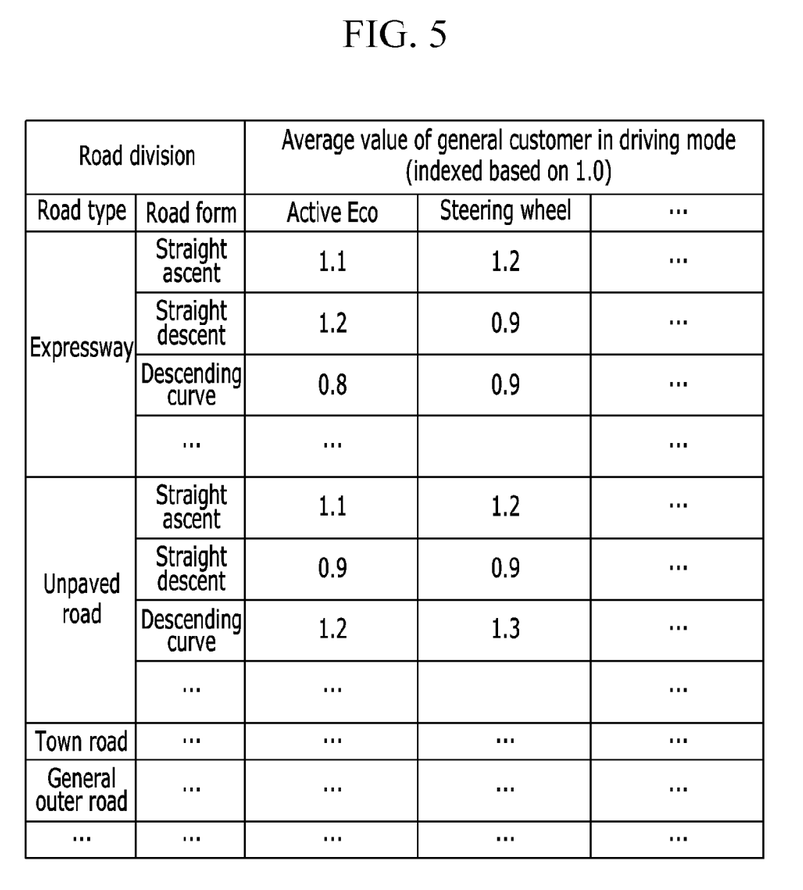
FIG. 5 is a diagram illustrating a general customer average value of driving mode information depending on road division of a driving mode recommendation system according to an exemplary embodiment of the present disclosure.
Figure 6:
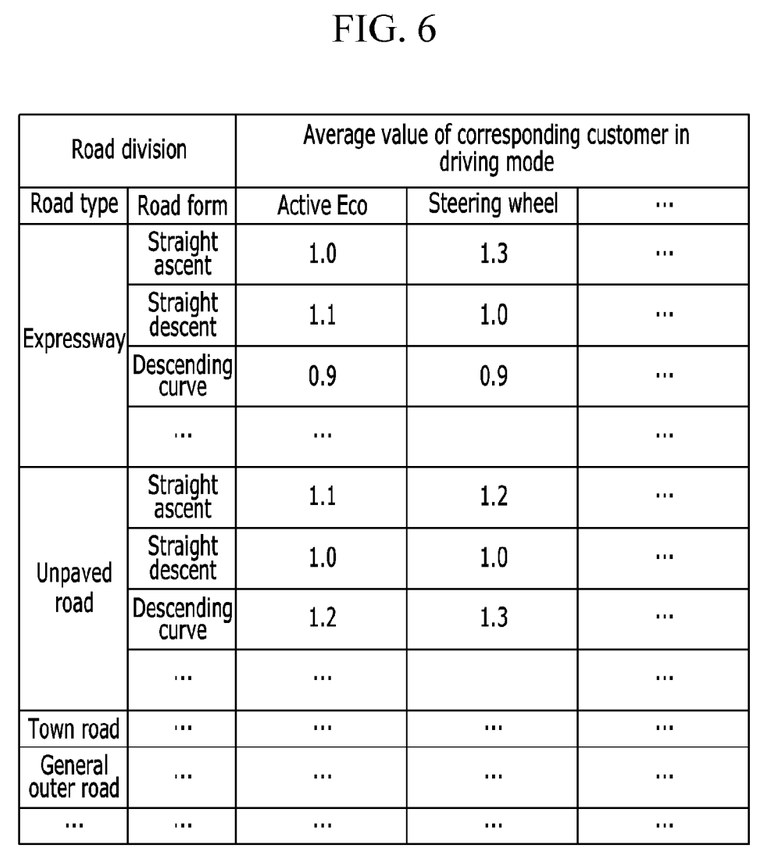
FIG. 6 is a diagram illustrating a corresponding customer average value of driving mode information depending on road division of a driving mode recommendation system according to an exemplary embodiment of the present disclosure.
Figure 7:
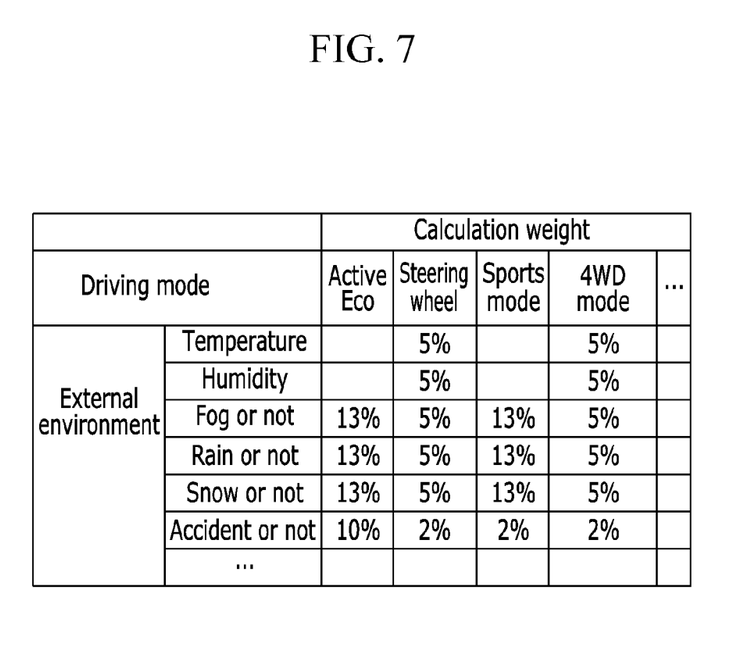
FIG. 7 is a diagram illustrating an example of correction depending on an external environment of a driving mode recommendation system according to an exemplary embodiment of the present disclosure.
Figure 8:
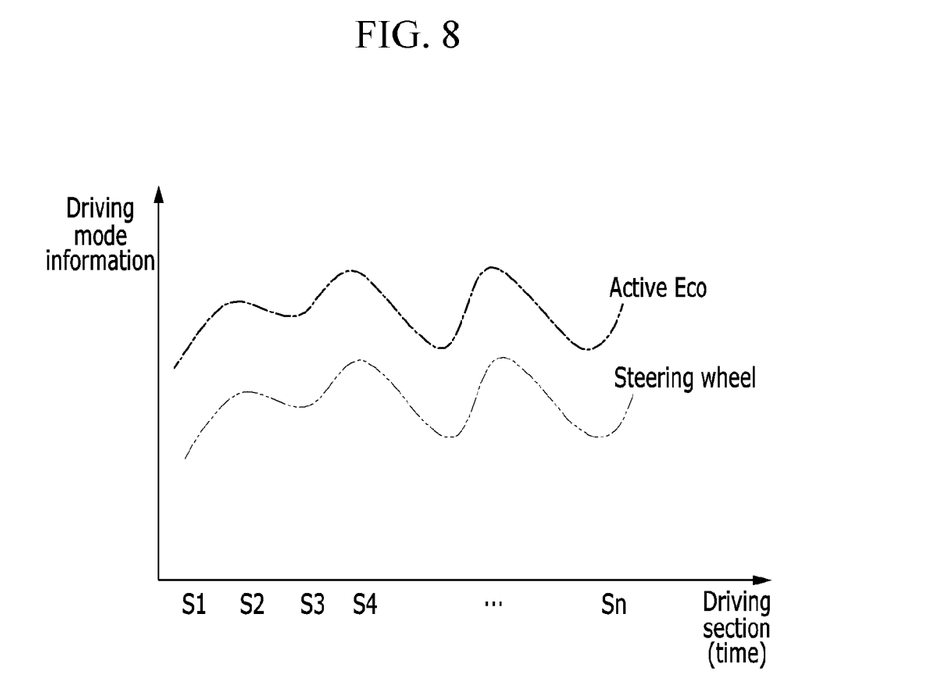
FIG. 8 is a diagram illustrating driving mode information depending on a driving section in a driving mode recommendation system according to an exemplary embodiment of the present disclosure.

FIG. 3 is an operational flowchart of a driving mode recommendation method according to an exemplary embodiment of the present disclosure. FIG. 4 is a diagram illustrating an example in which a route from a starting point to a destination is divided into sections in a driving mode recommendation system according to an exemplary embodiment of the present disclosure. FIG. 5 is a diagram illustrating a general customer average value of driving mode information depending on a road division of a driving mode recommendation system according to an exemplary embodiment of the present disclosure. FIG. 6 is a diagram illustrating a corresponding customer average value of driving mode information depending on road division of a driving mode recommendation system according to an exemplary embodiment of the present disclosure. FIG. 7 is a diagram illustrating an example of correction depending on an external environment of a driving mode recommendation system according to an exemplary embodiment of the present disclosure. FIG. 8 is a diagram illustrating driving mode information depending on a driving section in a driving mode recommendation system according to an exemplary embodiment of the present disclosure.

Referring to FIG. 3, when traveling of a customer vehicle is ended, the terminal 200 of the customer vehicle transmits customer information and driving mode information to the server 110. Herein, the terminal has a wireless communication function and may transmit data in at least one of various wireless modes including the CDMA mode, the Wi-Fi mode, 3G, 4G, and the like. In addition, the driving mode information includes the active eco mode, the steering mode, the sport mode, the 4WD mode, and the like, and besides, other modes may be added or deleted.

Then, the driving mode information receiver 111 of the server 110 receives the customer information, and traveling information and the driving mode information of the vehicle from the terminal 200 of the customer vehicle to accumulate and store the received information in the database 120. In this case, even when the customer drives the vehicle by changing the recommendation mode while driving, all the driving mode information and driving information regarding the case are stored after driving, and thereafter, transmitted by the terminal 200. As a result, the driving information and the driving mode information may be optimized, and accumulated and stored for each customer. Then, personalized driving mode information is generated for each of most driving section classifications (road type/road form combination) and stored in the database 120 (S300).

Further, while driving modes of a plurality of customers are stored, individual driving modes of the plurality of customers and driving mode average value information of a general customer are generated and stored in the database 120, as necessary. In addition, only the accumulated driving mode information is stored, and thereafter, the driving mode average value of the general customer may be calculated and used when required. Such a process is continuously repeated, and the driving mode information of the corresponding customer or the general customer is accumulated and stored in the database 120.

When a destination is input through the input 220 of the terminal 200 in order to go to the destination desired by the customer, the controller 230 of the terminal 200 transmits information on the destination, a starting point, and the customer to the server 110 through the communicator 240. Then, the route information receiver 112 of the server 110 receives the starting point and the destination from the terminal 200 of the corresponding customer vehicle (S301).

Thereafter, the recommendation mode information generator 113 divides a route from the starting point to the destination which are received into a plurality of sections according to the road type and the road form. For example, as illustrated in FIG. 4, the route is divided into unit sections, that is, S1, S2, . . . , Sn. In this case, the route follows the road division, and as illustrated in FIG. 5 or 6, the route is divided according to the road type into an expressway, an unpaved road, a town road, a general outer road, and thereafter, subdivided according to the road form into a straight ascent, a straight descent, a descending curve, an ascending curve, and the like to partition the section. Then, the recommendation mode information generator 113 determines whether driving mode information corresponding to a corresponding section is stored in the database 120 for each of the divided sections S1, S2, . . . , Sn (S302).

The recommendation mode information generator 113 generates the average value information of the general customer as the recommendation mode information for a section in which the vehicle is not driven in the related art or a section where the driving mode information is not stored in the database 120 (S304) (S305).

Referring to FIG. 5, as the driving mode average value of the general customer, an active eco mode value is 1.1, a steering mode value is 1.2, and the like in the straight ascent section of the expressway. Herein, a reference value is a standard value as 1, and when the active eco mode value and the steering mode value have higher values than the reference value, the active eco mode value and the steering mode value are increased to 1 or more. When the active eco mode value and the steering mode value have lower values than the reference value, the active eco mode value and the steering mode value are decreased to 1 or less. In addition, the index is based on a predetermined probability curve and is acquired by determining a position of a driving mode value of a corresponding customer in normal distribution values of all customers. For example, when it is assumed that a middle part is 1 in a normal distribution curve, it may be defined that the index is closer to 0.5 toward a left side, and the index is closer to 1.5 toward a right side. The definition may be variously modified as necessary, and the indexed value may be expressed in various modes as necessary.

In the section where the vehicle is driven in the related art, the recommendation mode information generator 113 generates the stored driving mode information as the recommendation mode information for the section where the driving mode information is stored in the database 120 (S304) (S306).

Referring to FIG. 6, the active eco mode value is stored as 1.0, the steering mode value is stored as 1.3, and the like when the driving mode of the corresponding customer is the straight ascent section of the expressway. The recommendation mode information is generated by such a process and thereafter, the recommendation mode information corrector 114 corrects the generated recommendation mode information of each section by reflecting the external environment information (S308). Referring to FIG. 7, the recommendation mode information including the active eco mode, the steering mode, the sport mode, the 4WD mode, and the like is corrected with a predetermined percentage according to the external environment information including a temperature, humidity, fog, rain, snow, an accident or not, and the like.

For example, in the case of the active eco mode among the driving modes, weights of 10%, 13%, 13%, and 10% are granted to the fog or not, the rain or not, the fog or not, and the accident or not, respectively, and the recommendation mode information is corrected. In addition, in the case of the steering mode among the driving modes, weights of 5%, 5%, 5%, and 2% are granted as the fog or not, the rain or not, the fog or not, and the accident or not, respectively, and the recommendation mode information is corrected. A calculation weight for correcting the recommendation mode may be modified in various methods and may be added, deleted, and changed as necessary.

Thereafter, the recommendation mode information corrector 114 transmits the corrected recommendation mode information to the terminal 200 of the customer vehicle (S310). The recommendation mode corrector 114 may include a transceiver that performs a communication function therein as necessary. The recommendation mode information is illustrated in FIG. 8, and the recommendation modes including the active eco mode and the steering mode are illustrated for each driving section. Thereafter, the controller 230 receives the corrected recommendation mode information through the communicator 240 and displays the received recommendation mode information in the display 210.

Thereafter, the customer selects the recommendation mode information to verify or apply the recommendation mode information through the terminal 200 of the customer vehicle, and as a result, the mode setting controller 300 controls the vehicle to be driven in the selected driving mode. The controller 230 stores the driving information and the driving mode information in the storage 250 while driving the vehicle and stores changed information in the storage 250 even when the customer changes the recommendation mode while driving. In addition, the controller 230 stores the driving information and the driving mode information in the storage 250 while driving the vehicle and stores changed information in the storage 250 even when the customer changes the recommendation mode while driving.

As in the above process, driving mode information and driving information for individual customers are stored while driving the vehicle, and thereafter, the terminal 200 transmits the information to the server 110. As a result, the driving information and the driving mode information are optimized to be accumulated and stored for each customer. Therefore, an optimal driving mode reflected with an environmental condition or customer characteristics including a usual driving habit, and the like may be recommended for drivers.

In addition, the driving mode reflected with the environmental condition or the customer characteristics including the usual driving habit, and the like may be recommended for the drivers and the driving mode is applied, and as a result, stable and safe driving can be achieved by providing a similar driving environment as usual.

Further, although the driver goes on a first trip which the driver has not traveled, the driver is recommended with the driving mode through an average value of general drivers to drive the vehicle, thereby achieving the safe driving.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A driving mode recommendation method that stores driving mode information in a database for each customer, which includes a road type and a road form and recommends a driving mode based on customer characteristic information and environment analysis information, the method comprising steps of:
   receiving, by a server, a starting point and a destination from a terminal of a corresponding customer vehicle;
   dividing, by the server, a route from the starting point to the destination received into sections according to the road type and the road form;
   determining, by the server, whether the driving mode information is stored in the database for each of the divided sections;
   generating, by the server, the stored driving mode information as recommendation mode information for a section where the driving mode information is stored in the database; and
   generating, by the server, average value information of a general customer as the recommendation mode information for a section where the driving mode information is not stored in the database,
   wherein the recommendation mode information includes information regarding an active eco mode and a steering mode.

2. The method of claim 1, further comprising steps of:
   correcting, by the server, the generated recommendation mode information of each section by reflecting external environment information; and
   transmitting, by the server, the corrected recommendation mode information to the terminal of the customer vehicle.

3. The method of claim 1, wherein:
   the road type includes at least one of an expressway, an unpaved road, a town road, and a general outer road.

4. The method of claim 1, wherein:
   the road form includes at least one of a straight ascent, a straight descent, a descending curve, and an ascending curve.

5. The method of claim 2, wherein:
   external environment information includes information regarding at least one of a temperature, humidity, fog, rain, snow, and an accident or not.

6. The method of claim 1, wherein:
   the recommendation mode information further includes information regarding a 4 wheel drive (WD) mode, and the steering mode includes a normal steering mode and a sport mode.

7. A driving mode recommendation system that communicates with at least one terminal of a customer vehicle, the system comprising:
   a database storing driving mode information of a customer, average value driving mode information of a general customer, road type and road form information, and environment analysis information; and
   a server receiving a starting point and a destination from the terminal of the customer vehicle, dividing a route from the starting point to the destination received into sections according to a road type and a road form, generating the stored driving mode information as recommendation mode information for a section where the driving mode information is stored in the database for each divided section, and generating average value information of the general customer as the recommendation mode information for a section where the driving mode information is not stored in the database,
   wherein the recommendation mode information includes information regarding an active eco mode and a steering mode.

8. The system of claim 7, wherein:
   the server corrects the generated recommendation mode information of each section by reflecting external environment information and transmits the corrected recommendation mode information to the terminal of the customer vehicle.

9. The system of claim 8, wherein:
   the server receives customer information, driving information, and the driving mode information of the customer vehicle from the terminal of the customer vehicle and accumulates and stores the received information in the database, when driving of the customer vehicle is ended.

10. The system of claim 7, wherein the server includes:
    a driving mode information receiver receiving customer information, driving information, and driving mode information of the customer vehicle from the terminal of the customer vehicle and accumulating and storing the received information in the database, when driving of the customer vehicle is ended, and storing the driving mode information of the general customer in the database;
    an information receiver receiving the starting point and the destination from the terminal of the customer vehicle;
    a recommendation mode information generator dividing the route from the starting point to the destination received by the information receiver into the sections according to the road type and the road form, generating the stored driving mode information as the recommendation mode information for the section where the driving mode information is stored in the database for each divided section, and generating the average value information of the general customer as the recommendation mode information for the section where the driving mode information is not stored in the database; and
    a recommendation mode information corrector correcting the generated recommendation mode information by reflecting external environment information and transmitting the corrected recommendation mode information to the terminal of the customer vehicle.

11. The system of claim 10, wherein:
    the external environment information includes information regarding at least one of a temperature, humidity, fog, rain, snow, and an accident or not.

12. The system of claim 7, wherein
    the recommendation mode information further includes information regarding a 4 wheel drive (WD) mode, and the steering mode includes a normal steering mode and a sport mode.

* * * * *